US012461029B2

(12) United States Patent
Ruberti

(10) Patent No.: US 12,461,029 B2
(45) Date of Patent: Nov. 4, 2025

(54) CONTINUOUS FLOW AIR SAMPLING AND RAPID PATHOGEN DETECTION SYSTEM

(71) Applicant: Northeastern University, Boston, MA (US)

(72) Inventor: Jeffrey Ruberti, Lexington, MA (US)

(73) Assignee: Northeastern University, Boston, MA (US)

( * ) Notice: Subject to any disclaimer, the term of this patent is extended or adjusted under 35 U.S.C. 154(b) by 719 days.

(21) Appl. No.: 17/692,034

(22) Filed: Mar. 10, 2022

(65) Prior Publication Data

US 2022/0291128 A1 Sep. 15, 2022

Related U.S. Application Data

(60) Provisional application No. 63/159,423, filed on Mar. 10, 2021.

(51) Int. Cl.
| | |
|---|---|
| *G01N 21/64* | (2006.01) |
| *B01L 3/00* | (2006.01) |
| *G01N 33/58* | (2006.01) |
| *G01N 1/22* | (2006.01) |

(52) U.S. Cl.
CPC .... *G01N 21/6428* (2013.01); *B01L 3/502715* (2013.01); *B01L 3/502723* (2013.01); *G01N 21/6454* (2013.01); *G01N 33/582* (2013.01); *B01L 2200/0684* (2013.01); *B01L 2200/10* (2013.01); *B01L 2200/16* (2013.01); *B01L 2300/0663* (2013.01); *B01L 2300/0803* (2013.01); *B01L 2300/161* (2013.01); *G01N 1/22* (2013.01); *G01N 2001/2244* (2013.01); *G01N 21/6402* (2013.01); *G01N 2021/6463* (2013.01); *G01N 2800/26* (2013.01)

(58) Field of Classification Search
CPC .......... G01N 21/6428; G01N 21/6454; G01N 33/582; G01N 1/22; G01N 21/6402

USPC .......................................................... 73/31.02

See application file for complete search history.

(56) References Cited

U.S. PATENT DOCUMENTS

2003/0170613 A1* 9/2003 Straus ................ G01N 21/6428 435/5
2008/0003142 A1* 1/2008 Link ................. B01L 3/502784 264/219
2008/0032420 A1* 2/2008 Lambert .......... G01N 33/54388 436/514
2013/0260447 A1* 10/2013 Link ..................... G01N 35/08 435/283.1

OTHER PUBLICATIONS

Rahmani et al., "Sampling and detection of corona viruses in air: A mini review", Science of the Total Environment 740 (2020) 140207, 7 pages.

(Continued)

*Primary Examiner* — Peter J Macchiarolo
*Assistant Examiner* — Rodney T Frank
(74) *Attorney, Agent, or Firm* — Verrill Dana, LLP

(57) ABSTRACT

Methods and devices for continuous flow monitoring of a liquid sample for presence of an airborne microbial pathogen are provided. The liquid sample can be derived from environmental air. The methods and devices provide for continuous labeling of a targeted pathogen in the liquid sample with a fluorescent probe. A customized fluorescence detector is provided that can detect labeled pathogens during continuous flow.

19 Claims, 8 Drawing Sheets

Specification includes a Sequence Listing.

(56) References Cited

OTHER PUBLICATIONS

CDC guidance: cdc.gov/coronavirus/2019-ncov/lab/resources/antigen-tests-guidelines.html , 2019, 5 pages.

Chen et al., "Human monoclonal antibodies block the binding of SARS-COV-2 spike protein to angiotensin converting enzyme 2 receptor", Cellular and Molecular Immunology, 17 (2020) pp. 647-649.

Huang et al., "Structural and functional properties of SARS-COV-2 spike protein: potential antivirus drug development for COVID-19", Acta Pharmacologica Sinica, 41 (2020) 1141-1149.

Fukami et al., "Assessment of supervised machine learning methods for fluid flows", Theoretical and Computational Fluid Dynamics, 34 (2020), pp. 1-25, (arXiv:2001.09618).

Maulik et al., "Probabilistic neural networks for fluid flow surrogate modeling and data recovery", Physical Review Fluids, 5 (2020) 24 pages, (arXiv:2005.04271v3).

Wales et al., "High-speed and high-resolution UPLC separation at zero degrees Celsius", Anal Chem., 80 (2008) pp. 1-11.

Taira et al., "Modal Analysis of Fluid Flows: An Overview", AIAA Journal, vol. 55, No. 12, (2017), pp. 4013-4041.

Taira et al., "Modal Analysis of Fluid Flows: Applications and Outlook", AIAA Journal, vol. 58, No. 3, (2020) pp. 998-1022.

Bin et al., "Thermoacoustic modeling and uncertainty analysis of two-dimensional conductive membranes", Journal of Applied Physics, Feb. 2015, 117(6):064506, pp. 1-10.

Konermann et al., "Hydrogen exchange mass spectrometry for studying protein structure and dynamics", Chem. Soc. Rev., 2011, 40, pp. 1224-1234.

Faull et al., "Hydrogen-deuterium exchange signature of porcine cerebroside sulfate activator protein", J Mass Spectrom, 35, pp. 392-401 (2000).

Zheng et al., "Protein dynamics and conformational changes explored by hydrogen/deuterium exchange mass spectrometry", Current Opinion in Structural Biology, 58 (2019) pp. 305-313.

Miranker et al., "Investigation of protein folding by mass spectrometry", Faseb J., 10 (1996) pp. 93-101.

\* cited by examiner

CONTINUOUS FLOW AIR SAMPLING AND RAPID PATHOGEN DETECTION SYSTEM

CROSS-REFERENCE TO RELATED APPLICATIONS

This application claims priority to U.S. Provisional Application No. 63/159,423, filed 10 Mar. 2021, entitled "Point of Care Viral Detection System Using Turbo Fluorescence In Situ Hybridization", the entirety of which is incorporated herein by reference.

STATEMENT REGARDING FEDERALLY SPONSORED RESEARCH OR DEVELOPMENT

This invention was made with government support under Grant Number NSF 2032501 awarded by the National Science Foundation. The government has certain rights in the invention.

BACKGROUND

In late 2019 the coronavirus SARS-CoV-2, which causes the disease COVID-19, began spreading. The highly contagious coronavirus has rapidly spread, resulting in the inundation of the international patient care resources and the COVID-19 pandemic. Testing of individuals with and without symptoms and of individuals suspected of infection has been a key to preventing spread, but testing has typically required reverse transcription polymerase chain reaction (rtPCR) applied to upper or lower respiratory specimens. The rtPCR specimens are usually obtained by nasopharyngeal swabbing, and the rtPCR test results can take days. To lower future case numbers, a more efficient and accurate point of care system is needed to limit transmission of the virus. This will allow people to quarantine faster and stop the spread. Faster testing methods and readily deployable tests are urgently needed for pathogen testing.

Rahmani, et al. provides a review of the current state of the art for sampling and detecting SARS-CoV-2 and other corona viruses in the air (Rahmani, et al., 2020). In this review, sampling techniques are classified into dry and wet collections. The dry collection typically involves filtration, while the wet collection typically involves impinging on or bubbling through a liquid bath. Both sample collection techniques have pros and cons. Filtration is efficient at collecting virus, but can be destructive to the virus and requires significant time-consuming post-processing to release the virus from the filter for testing. Wet collection typically results in intact viable viruses in a convenient transport medium, however, the large collection volume and the lower collection efficiency means that high viral loads or long sampling times are needed (Rahmani, et al., 2020). In all cases, air sampling is typically performed for several hours to collect sufficient viral loads to be tested with rtPCR. The rtPCR is both sensitive and selective, but it is not rapid and can take hours to obtain a reading. Thus, there are no current continuous monitoring systems capable of both collecting and then detecting airborne viral particles within a short timeframe.

SUMMARY

The present technology provides a Sentinel system that can rapidly scan incoming air, breath, or gaseous samples for presence of microbes and viruses. The Sentinel system can be deployed in high-traffic areas to quickly detect contamination in the air.

Sample collection methods and devices are disclosed to derive a liquid sample from air or exhaled breath. Methods of concentrating particles in the liquid sample can provide a continuous supply of liquid sample representative of the environment.

The present technology can be further summarized by the following list of features.

1. A device for automated detection of a microbial pathogen in air, the system comprising:
   a collection module operative to continuously collect an air sample suspected of comprising the microbial pathogen and form a continuously flowing liquid sample comprising the microbial pathogen from the air sample;
   a sample processing module operative to mix a labeling reagent with the flowing liquid sample, whereby the reagent labels the microbial pathogen to provide fluorescently labeled microbial pathogen suspended in a continuously flowing liquid stream;
   a centrifugation module comprising a spinning rotor operative to separate the fluorescently labeled pathogen in the continuously flowing stream from unbound labeling reagent and continuously flow the separated fluorescently labeled pathogen through a scanning region of the rotor; and
   a fluorescence detector operative to continuously scan the scanning region and detect the presence, absence, or amount of the fluorescently labelled pathogen.

2. The device of feature 1, wherein the centrifuge rotor comprises an inner wall, an outer wall, and a channel therebetween, wherein the channel is configured to accept the continuously flowing stream containing fluorescently labeled pathogen and unbound label at an upper region and to direct the stream downwards and outwards towards a lower region of the channel comprising the scanning region, and wherein the centrifuge rotor forms a sedimentation envelope that concentrates the labeled pathogen near the outer wall of the rotor at the scanning region.

3. The device of feature 2, wherein the outer wall comprises a transparent window covering the scanning region and one or more reflective strips disposed on an inner side of the outer wall; the reflective material operative to reflect fluorescence excitation light back to the detector to an autofocus mechanism of the detector.

4. The device of any of the preceding features, wherein the labeling reagent comprises a fluorescently labeled aptamer or antibody having binding specificity for a molecular component of the microbial pathogen.

5. The device of any of the preceding features, wherein the detector comprises, an excitation laser, a photomultiplier tube (PMT), an optical pickup (OPU), or a photodiode-array (PDA) or a combination thereof.

6. The device of feature 5, wherein the detector comprises an excitation laser having an illumination intensity of about $10^8$ mW/mm$^2$, a spot size of about 150 nm, and a wavelength of about 405 nm.

7. The device of any of the preceding features, wherein the detector is positioned exterior to the outer wall of the centrifuge rotor and is configured to provide fluorescence excitation light to the scanning region and receive fluorescence emission light from the scanning region, and wherein the detector employs an autofocus mechanism that enables substantially only fluorescence emission light from the labeled pathogen to be detected.

8. The device of feature 1, wherein the collection module comprises a condenser operative to cool a collection substrate below a dewpoint temperature, the condenser comprising a cooled hydrophobic central impact zone, a hydrophilic microfluidic channel or collection zone around the central impact zone, and a fluidic connection and optional pump capable of flowing collected liquid from the substrate to the sample processing module.

9. The device of any of the preceding features that provides detection in less than about 15 minutes after the air sample enters the collection module.

10. A method of detecting a microbial pathogen in an environmental air sample; the method comprising the steps:
   (a) providing the device of any of features 1-9 and a labeling reagent configured to bind and fluorescently label the microbial pathogen;
   (b) directing a flow of environmental air suspected of containing the microbial pathogen into the collection module of the device, whereby a liquid sample comprising the microbial pathogen from the air sample is formed;
   (c) labeling the microbial pathogen in the liquid sample by mixing the labeling reagent with the liquid sample, thereby yielding fluorescently labeled microbial pathogen in a continuously flowing liquid stream;
   (d) separating the fluorescently labeled pathogen in the continuously flowing stream from unbound labeling reagent using the centrifugation module and continuously flowing the separated fluorescently labeled pathogen through a scanning region of the rotor;
   (e) detecting the fluorescently labelled pathogen using the fluorescence detector to provide a signal as a measure of the presence, absence, or amount of the pathogen in the air sample.

11. The method of feature 10, further comprising:
   during step (b), cooling a collection substrate to below a dewpoint temperature of the environmental air and/or changing humidity of the collected environmental air to promote harvesting of aerosol droplets from the air.

12. The method of feature 10 or feature 11, further comprising intermittently dispensing a cleaning agent into the spinning centrifuge.

13. The method of any of features 10-12, wherein steps (b)-(e) are performed continuously in continuous flow fashion.

14. The method of any of features 10-13, wherein the time from intake of an air sample to detection of a pathogen in the sample is less than about 15 minutes.

15. The method of any of features 10-14, wherein the microbial pathogen is a virus or bacterium that causes a respiratory disease.

16. The method of feature 15, wherein the microbial pathogen is SARS-CoV-2.

17. The method of any of features 10-16, wherein the labeling reagent comprises a fluorescently labeled aptamer or antibody.

18. A kit for automated detection of a microbial pathogen in environmental air, the kit comprising:
   the device of any of features 1-9; and
   one or more labeling reagents for use with the device to detect one or more selected pathogenic microbes.

19. The kit of feature 18, wherein the kit is configured to be deployed in an airport, a jet, a train, a terminal, a theatre, a military facility, a prison, a medical facility, a factory, a warehouse, a school, a nursery, an office, or a hospital.

As used herein, the term "about" refers to a range of within plus or minus 10%, 5%, 1%, or 0.5% of the stated value.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with the alternative expression "consisting of" or "consisting essentially of".

DETAILED DESCRIPTION

The present technology provides highly accurate, rapid, and low-cost environmental air testing for pathogens such as SARS-CoV-2. The technology also provides a system for detecting COVID-19 infection in exhaled breath samples on a collection plate or other condenser.

The general detection system can be adapted to produce a flow through "Sentinel" system that detects fluorescently labeled antibodies bound to the target pathogens and employs a centrifuge (mini-fuge) based method to collect the particles near the wall of the mini-fuge device. Near the wall of the mini-fuge, the particles are collected in a sedimentation envelope with a greater thickness of the particle layer near the bottom of the envelope. A modified Blu-ray OPU is utilized to scan the greater thickness for fluorescence specific to bound antibodies. The scanning of the OPU is automatically focused on the greater thickness of the particle layer to avoid background noise from unbound fluorescent label in the liquid solution that escapes the mini-fuge through a spinning drain at the bottom. The system is capable of continuous operation.

Blu-ray disk systems include an OPU. The same type of OPU, with modifications, can scan the Sentinel system for labelled pathogens. Applied to an environment, the technology provides a simple, rapid, inexpensive, massively deployable, Sentinel system for detecting respiratory illnesses and airborne viral threats like SARS-CoV-2 in the environment. Successful deployment of the Sentinel system can allow public locations such as airport terminals, office buildings, schools, hospitals, etc. to be safely opened while they are continuously monitored for airborne SARS-CoV-2 particles.

There are three major challenges to developing a Sentinel system: sample collection, sample preparation and detection. The present technology combines a highly efficient condensation-based virus collection system to collect SARS-CoV-2 virus directly from exhaled breath with a detection system capable of rapidly identifying viral particles in less than about 15 minutes with both great specificity and high sensitivity.

Figure 1:
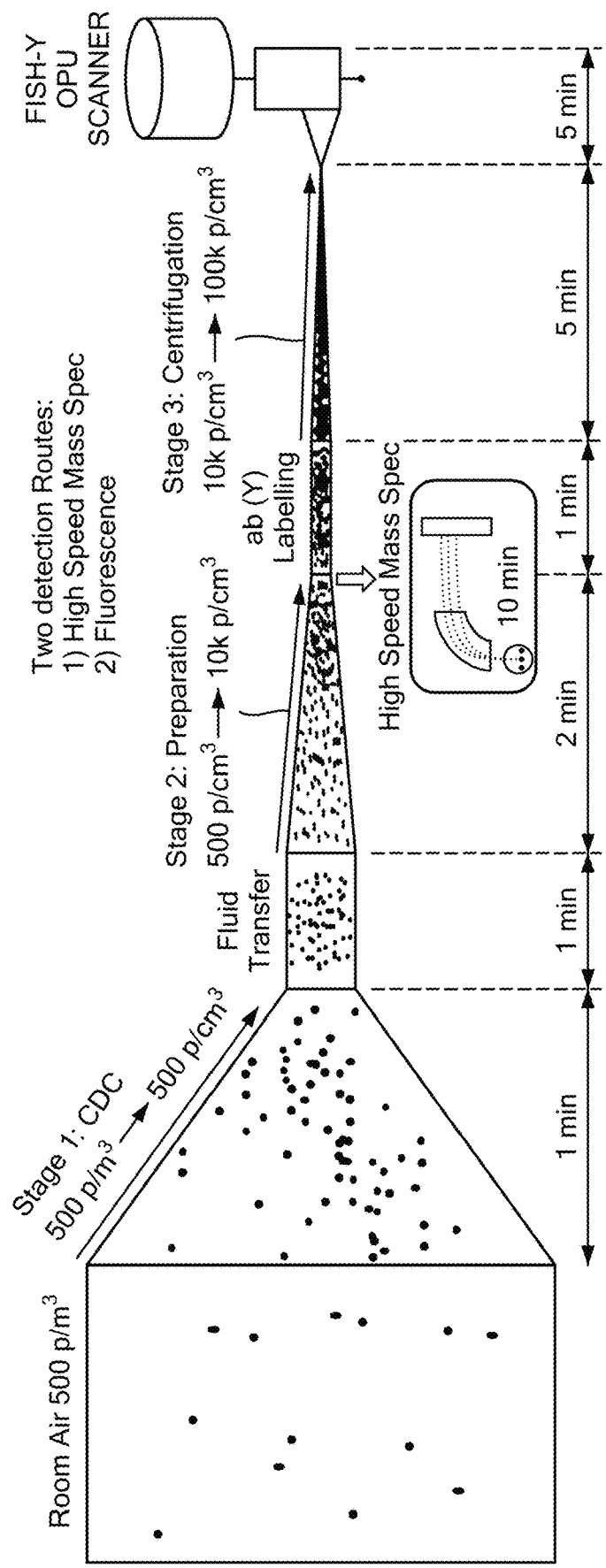
FIG. 1 shows an example of components of an embodiment of a Sentinel system. Room or environmental air is input (left), and particles and droplets are concentrated at Stage 1. The concentrate goes to a fluid transfer stage and then to a preparation Stage 2. High speed mass spectrometry (MS) can be implemented after Stage 2, or the liquid sample can proceed to fluorescence antibody labeling or other fluorescence labeling, centrifugation at Stage 3, and detection via a customized fluorescence detector fabricated from an optical pickup unit (OPU).

The sample collection challenge can be met by almost any method to provide a liquid sample suspected of containing a pathogen. To collect room air, and example is depicted in FIG. 1. Room or environmental air is input (left), and particles and droplets are concentrated at Stage 1. The concentrate goes to a fluid transfer stage and then to a preparation Stage 2. High speed MS can be implemented after Stage 2, or the liquid sample can proceed to fluorescence antibody labeling or other fluorescence labeling, centrifugation at Stage 3, and detection via a customized fluorescence detector fabricated from an OPU. The centrifugation at Stage 3 is done with the mini-fuge discussed above. The modified OPU can also operate continuously.

In another sample collection example, sample collection technology of the Sentinel system can utilize continuous dropwise condensation (CDC). CDC is capable of efficiently extracting condensate and particulate (including viral particles) loads from humidified air by directing a high velocity jet of air at a chemically modified and precisely patterned cooled substrate. The efficiency of CDC is unmatched by any other condensation technology for converting humid air or steam to liquid condensate. The CDC droplet condensation system is described in WO2021/243035A1, which is hereby incorporated by reference in its entirety.

Figure 2A:
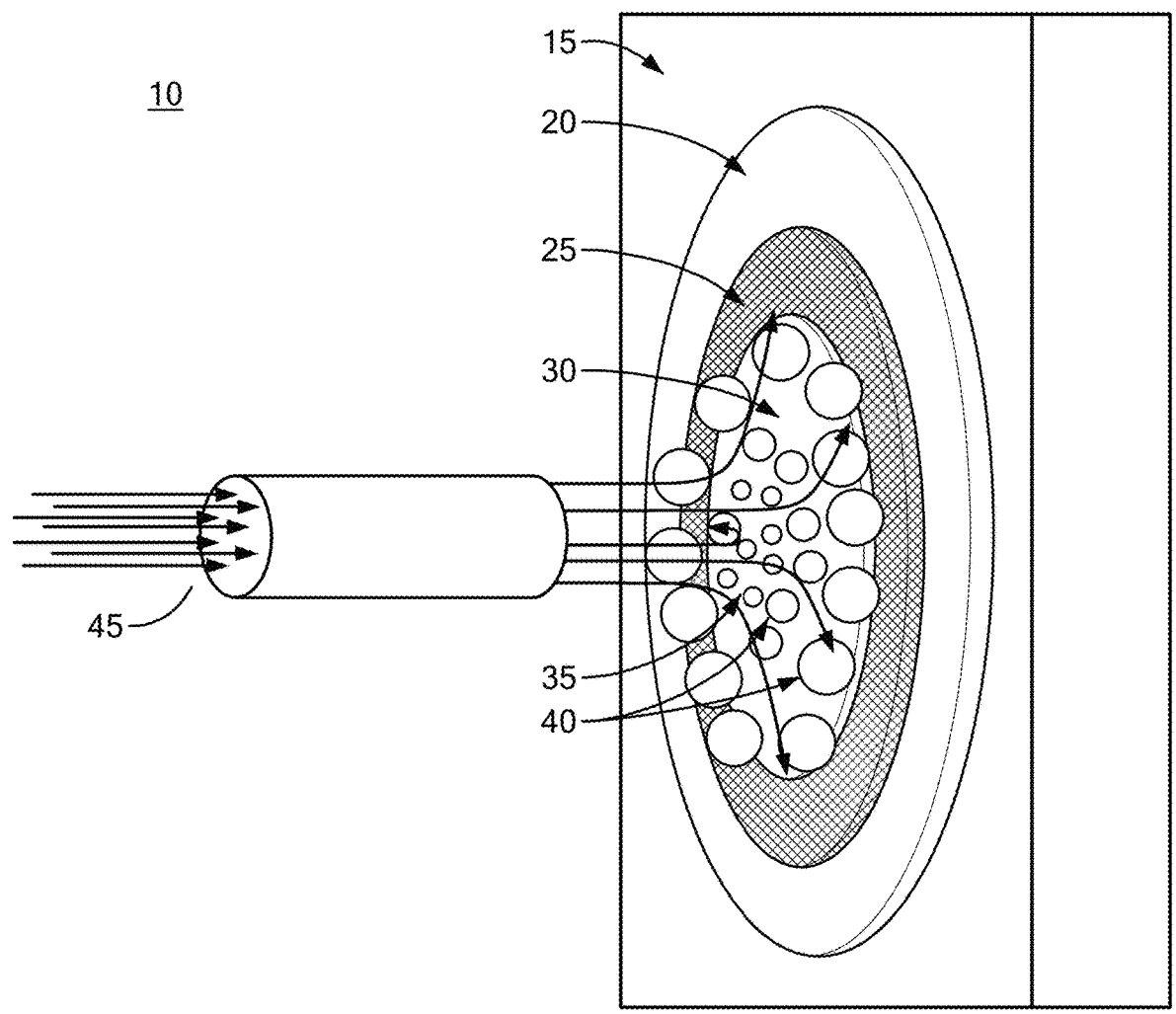
FIG. 2A shows a schematic illustrating a general concept of continuous dropwise condensation (CDC). An entering flow (e.g., patient exhalate, humidified air flow) is focused on center of cooled hydrophobic zone.

An application of the CDC concept is shown in FIG. 2A. In general, any condensation process transitions from dropwise to film condensation over time as liquid is accumulated. This can dramatically reduce the mass transfer coefficient and the rate of water accumulation on the surface. In CDC, the transition to film condensation is eliminated through a combination of hydrophobic (non-wetting) surface properties and the strong shear stresses imposed on the condensing droplets from the impinging jet of humid air.

FIG. 2A shows a schematic illustrating a general concept of CDC 10 wherein an entering flow 45 (e.g., patient exhalate, humidified air flow) is focused on center of plate (continuous condensation) 35 of cooled hydrophobic zone 30; small drops condense and are forced by coalescence of shear flow, shear driven drops 40 outward to a collection zone 25 within glass disk 20 on a cold block 15.

Figure 2B:
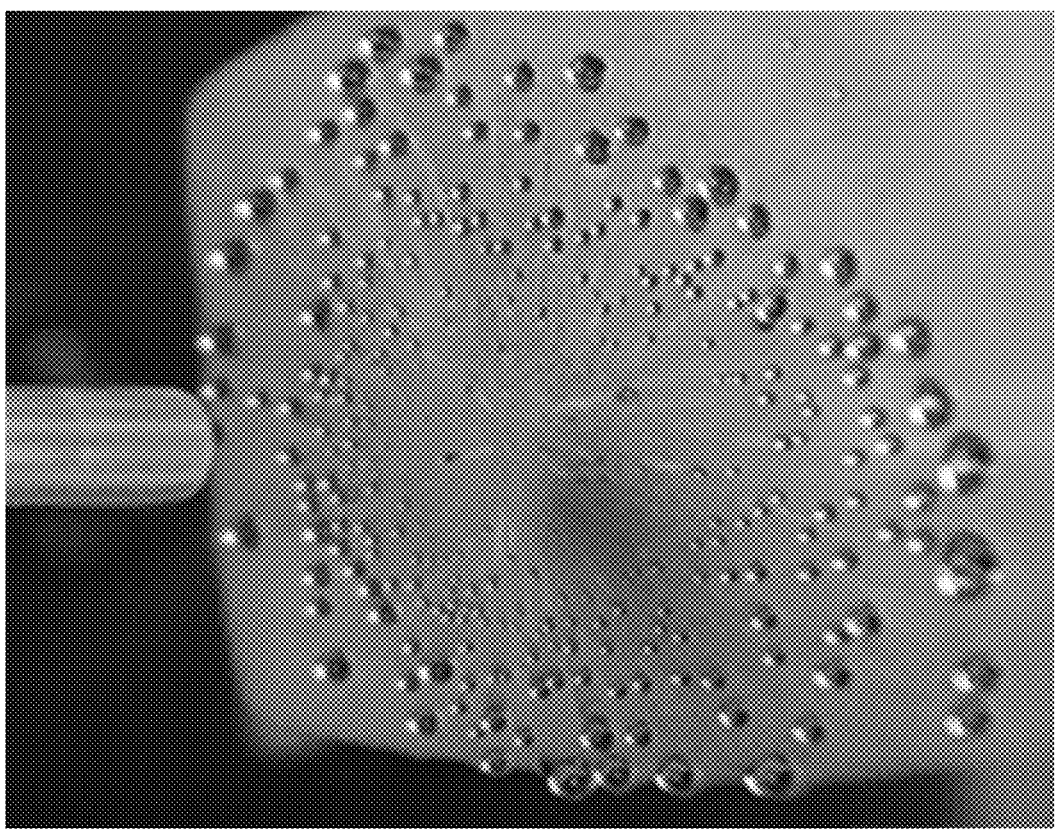
FIG. 2B shows a photo of CDC experimental results showing water condensation.
Figure 2C:
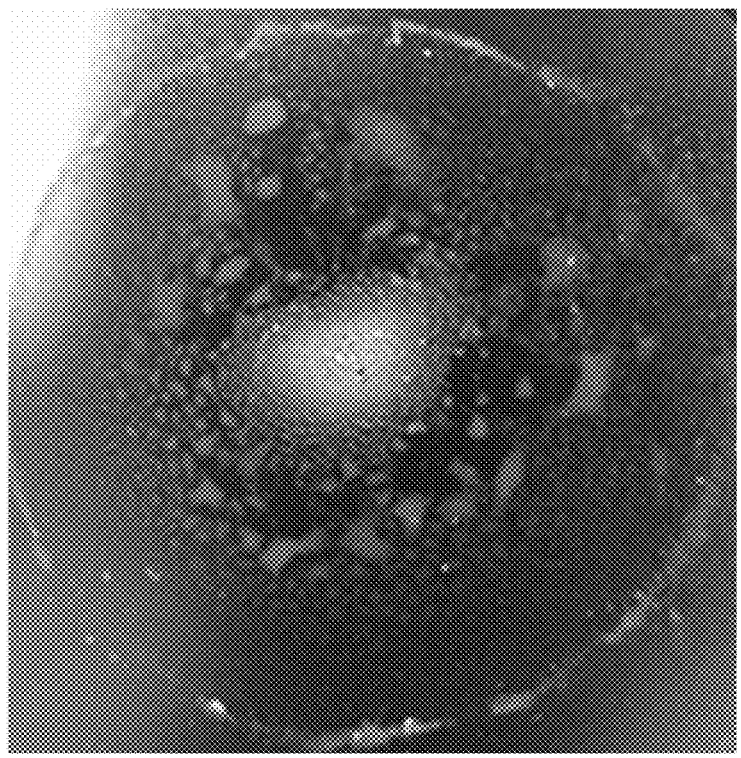
FIG. 2C shows a photo of CDC experimental results showing collection of 50 nm-100 nm fumed silica particles that were initially dispersed in the air.

In the example depicted in FIG. 2A, the shear from the airflow continuously displaces the condensed droplets from the cold hydrophobic impact zone to an annular hydrophilic collection zone from which the condensing fluid, loaded with viral particles, can be readily and continuously extracted. Experimental validation of this technique is shown in FIG. 2B and in FIG. 2C. FIG. 2B shows an experiment demonstrating ability to condense and collect water droplets from humidified air (70-80% RH; 25° C., 25L/minute) at a collected water rate of 200 mL/minute. FIG. 2C depicts an experiment showing collection of 50 nm-100 nm fused silica particles initially dispersed in the air.

The CDC technology is implemented into a handheld exhaled breath condensate collector. The collector can provide a non-invasive SARS-CoV-2 collection system capable of replacing swabs (e.g., nasopharyngeal swabbing) in clinical practice. As shown in FIG. 2B, the sample collector is capable of condensing more than 200 μmL of liquid water per minute at physiological air flow rates of 10 L/minute. This condensation rate is nearly 100× any other humid air condensation technique and can be easily tuned by changing the temperature of the substrate to maximize the particle concentration in the final sample. A central challenge for the technology is increasing viral titer in the collected sample volume. The potential ability to modulate the liquid volume independently of the particle harvesting sets the collection approach apart from other aerosol sampling systems. Experiments using micron and nanometer-sized seed particles and aerosols in FIG. 2C have shown a high collection efficiency within the central jet impingement zone (white center, FIG. 2C) where the flow stagnates and turns radially outward.

Figure 2D:
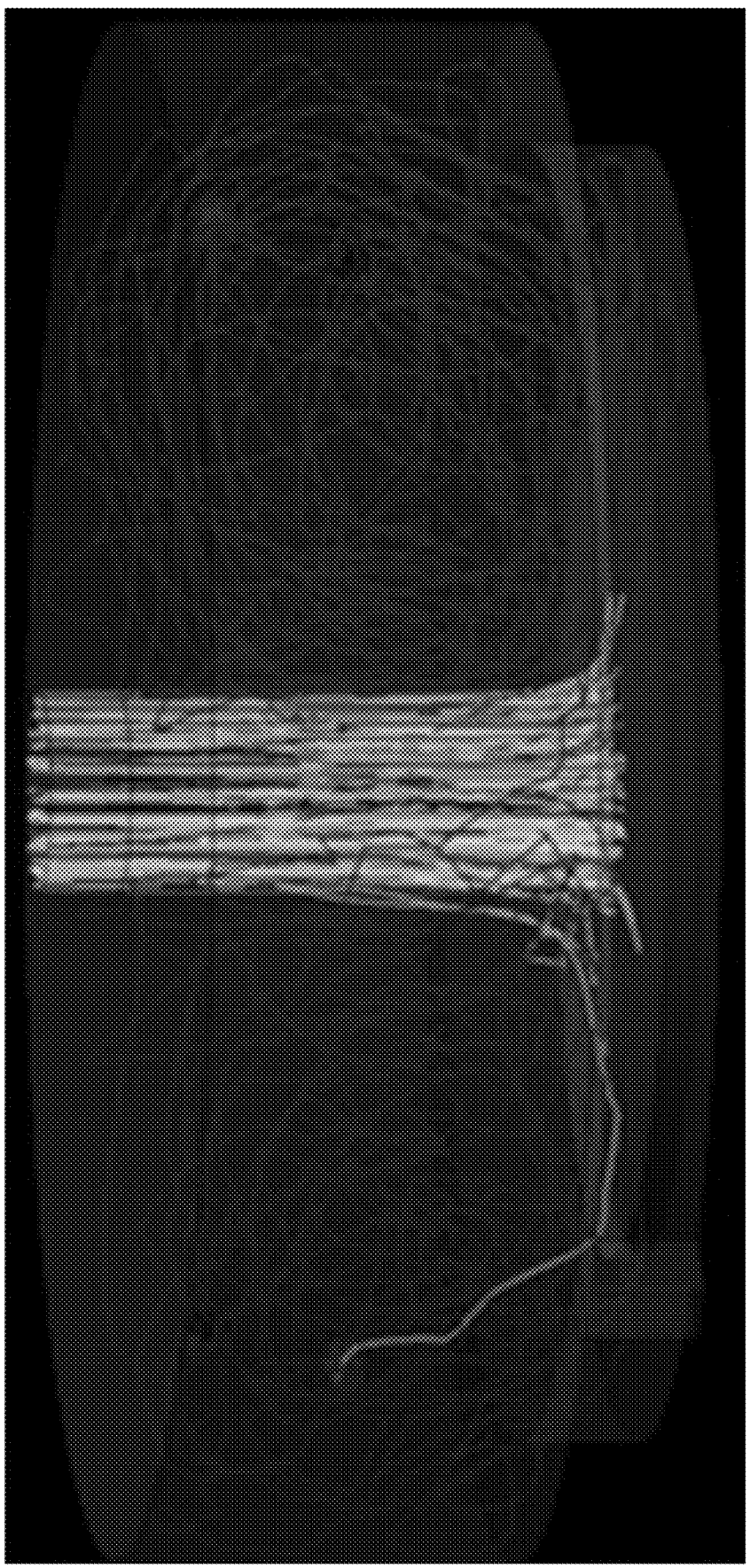
FIG. 2D shows results of CDC numerical simulations showing impact and collection of viral particles in the flow.

Numerical simulations depicted in FIG. 2D have shown a 100% collection of viral particles above 1 μm in diameter and a 75% collection efficiency for smaller viral particles, a remarkable achievement for such a simple device. Ultimately, CDC can provide a massive compression of the volume containing virus particles, efficiently capture the virus and convert the carrier fluid to a liquid, a process that is critical to support the performance of any detection method.

The American Society of Heating, Refrigerating and Air-Conditioning Engineers (ASHRAE) recommends that HVAC (heating, ventilating, and air conditioning) systems operate at an airflow rate of roughly 2 $m^3$/min per person occupying a space. Using a 5 m×4 m×3 m room as an example, at 60 $m^3$, this room should have its air replaced twice an hour. For a typical person infected with COVID-19, approximately 1000 viral particles/min are expelled during normal breathing. At equilibrium, the air in the room will contain 20,000 viral particles at a density of 333/$m^3$.

The Sentinel system can employ an array of impinging humid air jets operating in parallel that can process all the air running through the HVAC system collecting 500 viral particles/minute while controlling the volume collected to just a few mL of water in the example described above. This collection rate is more than sufficient to surpass the sensitivity thresholds for the novel antibody-based fluorescence imaging technique (described below) in about one minute. Given 10-15 minutes of collection, the titer collected can be sufficient for a variant of the better-known MS (mass spectrometry) approach.

Figure 3:
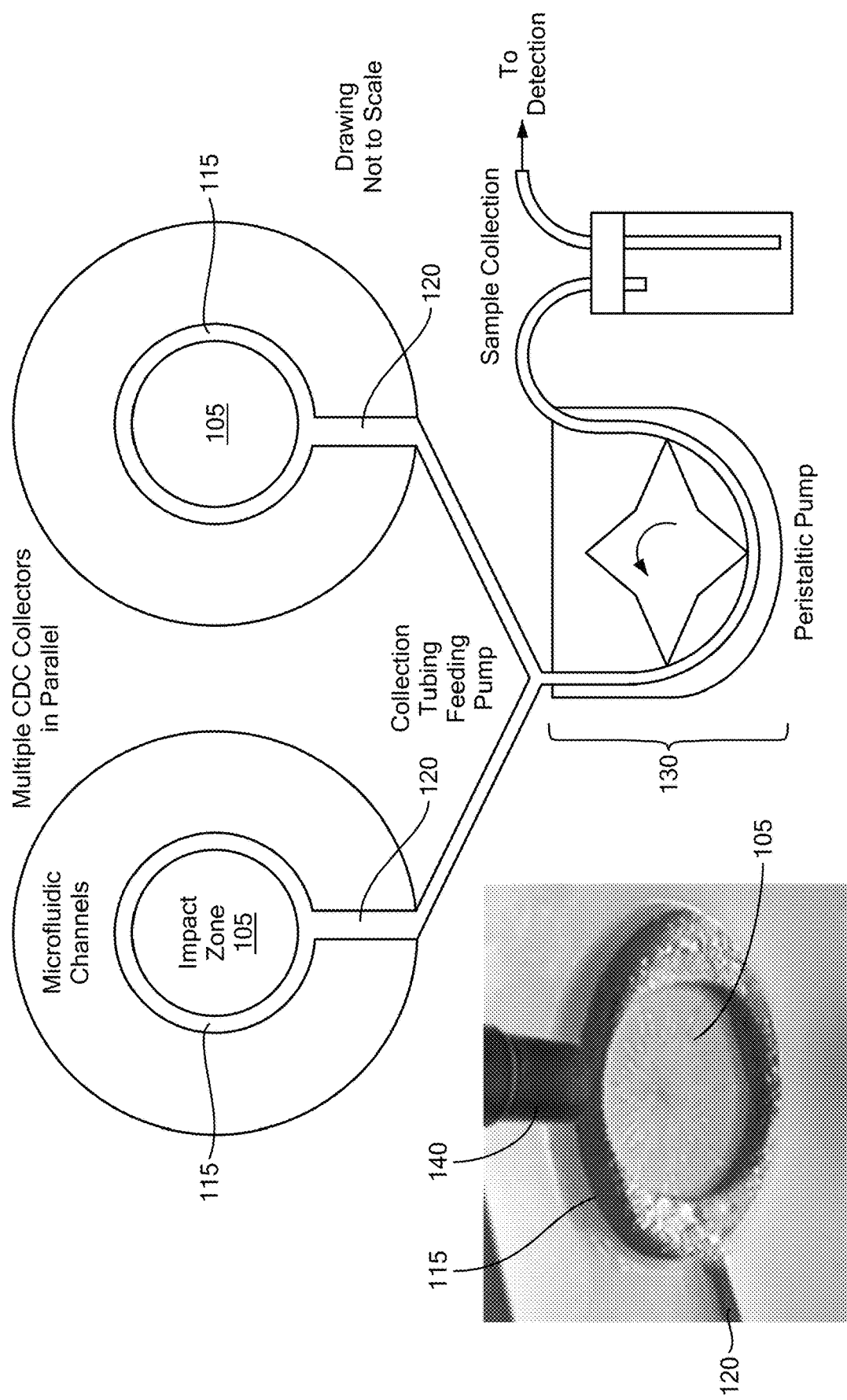
FIG. 3 shows a general schematic of the CDC collection system applied in a Sentinel system.
Figure 4A:
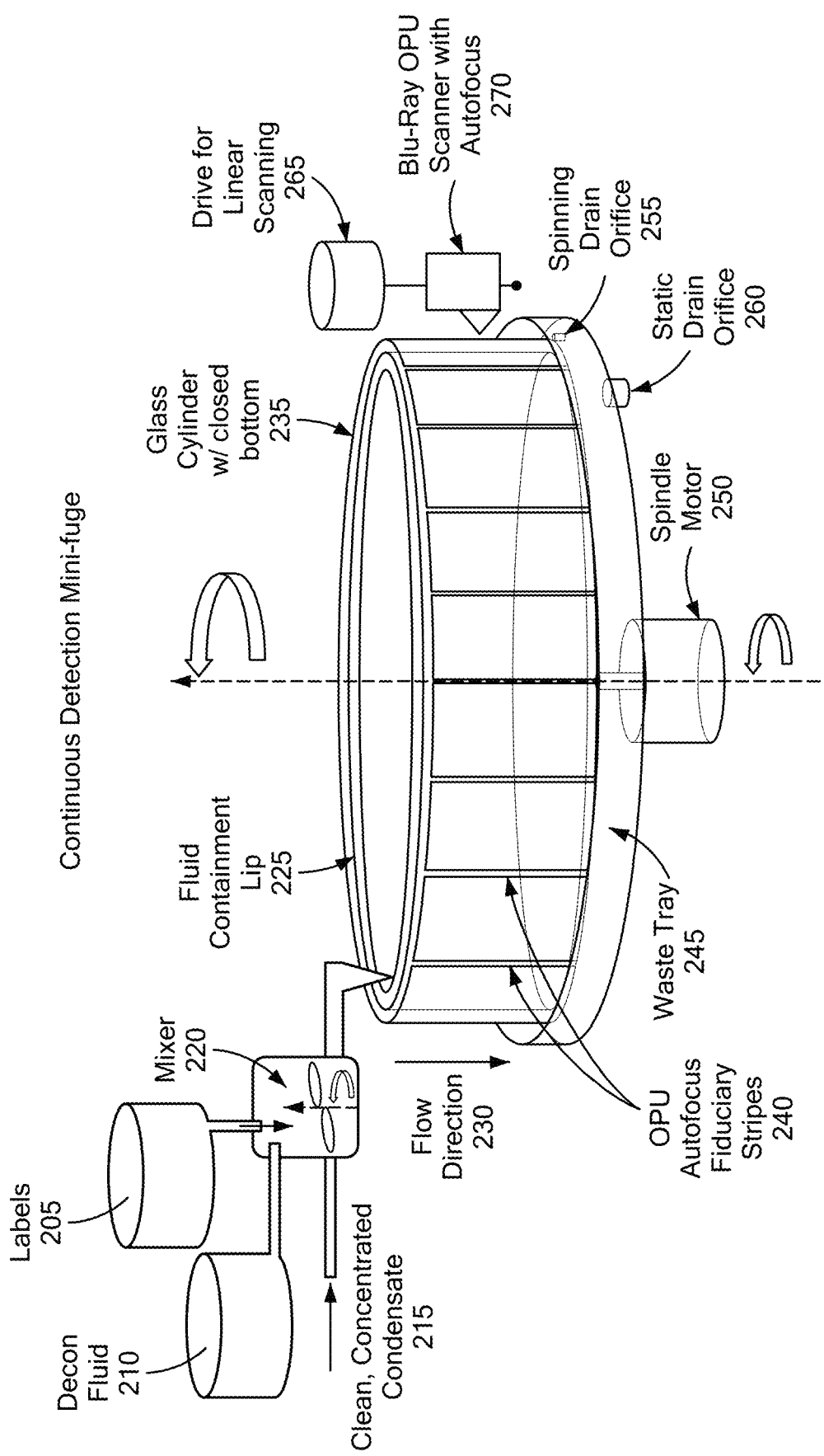
FIG. 4A shows a perspective view of a continuous detection mini-fuge with detection of fluorescently labeled microbes via a customized fluorescence detector fabricated from an OPU.
Figure 4B:
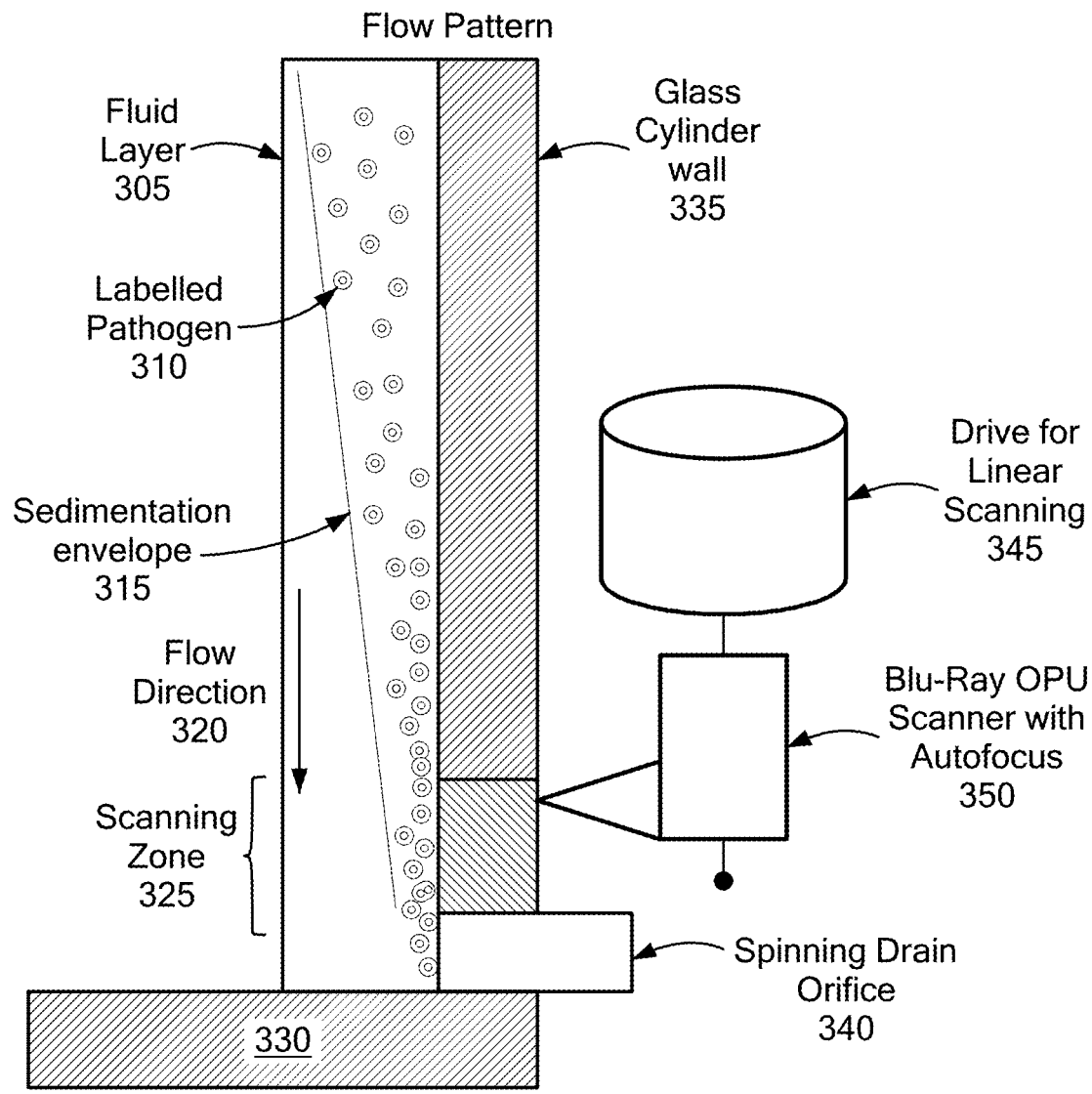
FIG. 4B shows a side view of a flow direction and a sedimentation envelope at a side of the continuous detection mini-fuge depicted in FIG. 4A.
Figure 5:
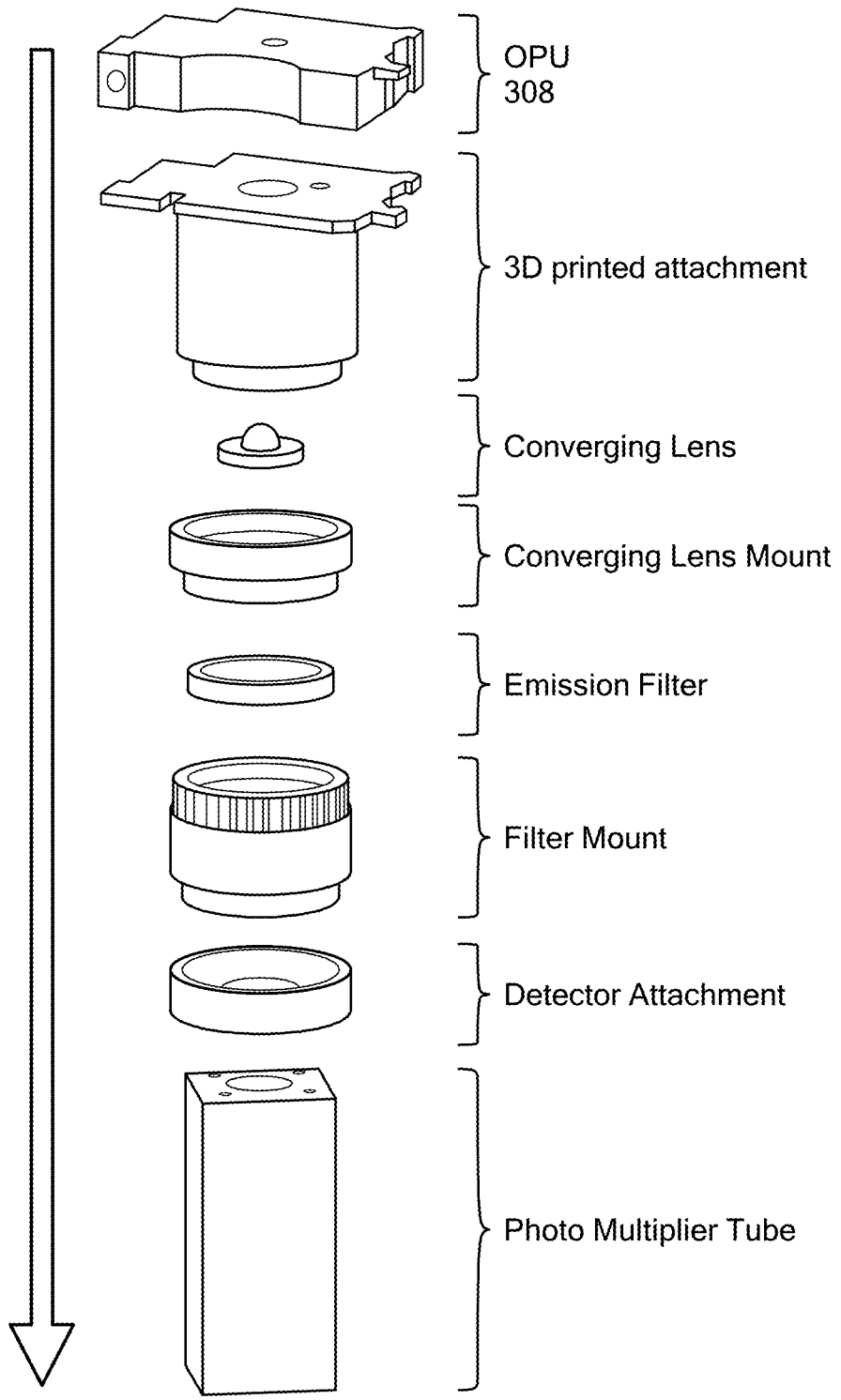
FIG. 5 shows components including the PMT of the OPU in FIG. 4B.

The sample includes a continuous stream of liquid water loaded with viral particles collected directly from the air. As shown in the example of FIG. 3, fluid handling can begin at the collection plate at the collection zone or impact zone 105. A series of microfluidic channels 115 are placed inside the collection zone shown in FIG. 3. These channels continuously collect liquid and virus particles from a gaseous sample introduced at nozzle 140. As the microfluid channels fill, gravity can feed the liquid into tubing 120. Tubing from multiple collection plates can be merged and fed into a central collection area 135 using a peristaltic pump 130 as shown in FIG. 3. From there, automated sample preparation begins.

It is important to note that the ease of fluid handling in the Sentinel system is a key advantage over dry collection techniques that use filters, in particular gel-based filters, which require considerable post processing or even dissolving of the filters to release the trapped virus and cannot be easily run continuously in contrast to the system disclosed herein.

As shown in FIG. 3, an array of collectors (e.g., two are shown, but more can be used, as desired) feed a continuous stream of condensed liquid and virus particles through a peristaltic pump and a sample collection reservoir where it can be extracted for processing and detection. A functional collector prototype with microfluidic channels is shown in the lower left of FIG. 3.

Sample Preparation Unit: The sample, distilled water from humid air and particles collected by CDC, are sent via the fluidic system to the sample preparation unit to be processed for detection. The ease of use and streamlined method of collection allow this transfer to be done continuously or in batches. Additionally, due to the cleanliness of the samples, little in the way of contamination removal is needed. However, due to the relatively small volumes of fluid and large virus titer needed for detection, specifically for mass spectrometry, some amount of concentrating of the sample can be required. This can be performed by the combination of heating and vacuum processing for rapid reduction of the sample volume. The amount of evaporation needed is dependent on the detection method and the condensation rate of the collector. At this stage, half the sample can be set aside for follow-up external testing for quality control and for confirmation in the case of an initial positive result. Following the concentration step, the samples are prepared for detection with the addition of reagents and antibodies as discussed in detail below. A second micro peristaltic pump can be utilized to transport the solution to the detector.

Detection Systems: There are a number of challenges that must be met to achieve COVID-19 detection from samples collected from air within 15 minutes. The rule of thumb is that both speed and sensitivity cannot easily be achieved, however, to successfully accomplish this goal, both are required. Standard testing techniques like rtPCR are sufficiently sensitive to enable detection of samples from just a few hundred captured virus particles; however, they are far too slow to meet the goals of rapid COVID-19 detection. There are a number of other alternatives, and each has challenges and risks associated with implementation in a Sentinel system. For that reason, two distinct detection methods are contemplated herein. The first employs fluorescently labeled antibodies to tag a pathogen such as SARS-CoV-2 for direct visualization. This technique has unmatched sensitivity and excellent selectivity; however, the method requires a fast-scanning fluorescence imaging system to interrogate the sample. The second detection technique is MS. This provides state of the art sensitivity, and it is readily adaptable for detecting other pathogens without changing sample preparation appreciably. However, the slow speed and low sensitivity of MS is challenging and can require sample concentration to provide sufficient viral loads for detection. Depending on the speed and sensitivity required, the more feasible of these techniques can be utilized with a prototype of the Sentinel system described herein.

Fluorescence detection technology: To continuously scan a large sample over long periods for a small number of dangerous pathogens with high-sensitivity, high-specificity and in nearly real-time requires that multiple problems are solved simultaneously. For example, these can include; 1) labelling the pathogen efficiently and uniquely; 2) concentrating the signal; 3) scanning large volumes at high-resolution (e.g., wide field microscopy); and 4) minimizing consumables and maintenance of the system. To address these issues, the present technology provides a new type of high throughput, concentrating, self-cleaning detector that can work with virtually any fluorescently labelled pathogen. The device takes advantage of the capability of CD/DVD/Blu-Ray technology which has been heavily developed by the electronics industry and which has the capacity to scan relatively large areas at high speed with high accuracy. FIG. 4A and FIG. 4B show a general schematic of the system with it is core components and an example of a final concentrating flow pattern.

FIG. 4A shows a perspective view of a continuous detection mini-fuge with detection of fluorescently labeled microbes via a customized fluorescence detector fabricated from an OPU. In FIG. 4A, a clean concentrated condensate 215 enters a mixer 220 and is mixed with fluorescent labels 205. An optional decontamination fluid 210 can be utilized to rinse the system. Mixed fluid exits the mixer and enters a fluid containment lip 225 of the mini-fuge, which is spinning via motor 250. The fluid containment lip is defined by the glass cylinder with a closed bottom 235. As the fluid is pulled down by gravity, a downward flow direction 230 results while the fluid is spun in the mini-fuge. Fluid exits through a spinning drain orifice or hole 255 and into a waste tray 245. On the inside wall of the glass cylinder 235, autofocus reflective strips or stripes 240 are placed to accommodate an autofocus function of the OPU scanner 270. The stripes 240 are placed on the inside wall of glass cylinder wall 235 (see FIG. 4B) where the particles are most concentration. The modified OPU includes an autofocus function wherein the Blu-ray laser reflects off the stripes 240 to autofocus the detector. A drive for linear scanning 265 can move the OPU up and down.

FIG. 5 shows components implemented in an embodiment of the OPU including an improved PMT and 3D printed attachment. A custom dichroic filter (not shown) replaces a mirror within the OPU. Within the OPU, the 405 nm laser passes through a mirror when exiting the OPU and when returning to the position detector integrated circuit. To transmit the fluorescence light emitted by the excited fluorophores into the photo multiplier tube, this mirror needs to be replaced with a dichromic long pass filter with a transmission wavelength of 470-1600 nm and a reflection wavelength of 350 nm-430 nm. A custom ordered 4.5×4.2×1.05 mm filter of these properties is utilized. The mirror is securely glued with 27B UV light glue in the same spot where the OPU's original mirror was.

FIG. 4B shows a side view of a flow direction and a sedimentation envelope at a side of the continuous detection mini-fuge depicted in FIG. 4A. As the fluid is pulled down by gravity in the mini-fuge, centrifugal force also pushes the fluid to the inside wall of glass cylinder wall 335. The fluid layer 305 has overall flow direction 320, while the particles form a sedimentation envelope 315 with a thicker layer (or concentration) at or near the bottom 330. The fluid and draining particles exit through the spinning drain orifice 340. A modified Blu-ray OPU with autofocus 350 and a drive for linear scanning 345 provide fluorescence detection.

The process can work in the following manner:

Labelling. Once the condensate has been collected via continuous dropwise condensation and has undergone an initial concentration step and coarse filtering, it is routed to a mixing tank which contains reagents for carrying out labeling of a pathogen of interest using fluorescently labeled antibodies.

For example, the reagents can include one or more fluorescently labeled oligonucleotide (e.g., RNA or DNA) probes, such as about 20 nucleotides in length, which specifically bind to a target nucleic acid (RNA or DNA) of the pathogen.

The reagents may also include one or more permeabilizing agents, such as surfactants and/or solvents. Reagent concentrations and reaction conditions are selected to favor rapid hybridization to the nucleic acid target(s) of the pathogen(s).

Alternatively, labeling in the mixing tank can be through binding of two color, dual-antibody labels specific for the pathogen in question and which produces optimal conditions for binding to the virus. Antibody labelling has high specificity, high affinity, and rapid development post-onset of a pandemic. Some of the first tests for the current SARS-CoV-2 pandemic were antigen tests (CDC guidance) and antibody development and design were quickly undertaken by the scientific community at large once the structure of the virus was known (Chen, et al., 2020). Human monoclonal antibodies to SARS-CoV-2 spike protein were reported as early as April 2020 (Huang, et al., 2020) and their development has continued such that there is now a myriad of them available for general sale and as approved treatment for SARS-CoV-2 (FDA issued Regeneron EUA Nov. 21, 2020). A critical assumption of this approach is that there will always be antibodies or virus binding analogs (e.g., engineered nanobodies) available with high affinity, high-specificity and relatively low-cost in the wake of a pandemic. There is no reason to doubt that this will not be the case going forward given the robust global biotechnology industry. Once labelled viruses have reached the exit of the mixer, after they have interacted with the antibodies under optimal binding conditions, the mixture is injected at the top of a spinning cylinder (mini-fuge).

Concentration of the pathogens. The purpose of the mini-fuge (centrifuge) is to concentrate labelled virus particles at the outer wall of the cylinder before they reach the "scanning zone" just prior to exiting the system, while leaving the labelled antibodies evenly distributed. This drastically increases the signal-to-noise ratio. Initial tests on pseudo-typed lentivirus suggest that viral particles of the same approximate constituents can be sedimented at about 3000 gs in ~5 minutes through about 5 mm of fluid (the theoretical value is ~6 minutes for a 150 nm virus with a density of 1.4). The mini-fuge is arranged such that the condensate with labelled virus must traverse from the injection point at the top of the cylinder to the drain at the bottom while sedimenting. The time of the vertical traverse and actual rotational speed necessary to sediment the virus to where it is readable by the OPU is optimized.

Wide Field Microscopy—Feasibilty with modified Blu-Ray OPU. Calculations show that the illumination intensity for Blu-Ray at 405 nm is ~$10^8$ mW/mm$^2$ on a spot size of about 150 nm. Given the numerical aperture of the Blu-Ray system (0.8) and the modifications herein (addition of a dichroic mirror, barrier filter and fast, sensitive PMT) the total optical efficiency is ~2.3%. Given a bright fluorophore (Brilliant Violet 421) the total number of photons that can be collected in about 100 nanoseconds is ~268.

While there are likely detectors that can capture on that time scale, fluorophore "fall times" are potentially longer than the traverse time. Thus, it is required to manage the rotational velocity for concentrating and detecting the virus, separately. In this example, what is used is a high rotational velocity to concentrate and a slower rotational velocity to scan. At 500 rpm, there is expected ability to be able to fully scan 1 cc of condensate in 8.6 minutes. Thus, the process from labelling to detection should take about 14 minutes with the potential ability to find a single virus in 1 mL. There is the possibility of faster continuous readout via manipulation of the geometry and increasing the OPU number. Additionally, if the detection threshold is relaxed to something more reasonable, 100 virus/m L, then the scanning time could decrease by a factor of 100 and a continuous flow-through system can be produced.

Self-cleaning. Because the system is designed for continuous use, it is necessary to keep it from becoming contaminated with material that can affect the reading. There are multiple ways to do that. Examples are: 1) a simple cleaning cycle can be added to the device to destroy pathogens; 2) the walls can be treated to reject materials (e.g., PEG coating); and 3) a thin layer of heavy immiscible fluid (e.g., perfluorodecalin) can be added to the device to coat the walls to prevent adhesion.

Mass spectrometry. The MS analysis can focus specifically on peptides defined by three criteria: their specificity for the SARS-2 corona virus, their production in high yield when the SARS-2 corona virus is trypsin digested, and their acceptable chromatographic and electrospray mass spectrometric responses. The focus can be on three tryptic peptides, although this can change with various requirements and as development of a detection method progresses. Prior work has shown the peptides ADETQALPQR (SEQ ID NO: 1), GFYAEGSR (SEQ ID NO: 2), and EITVATSR (SEQ ID NO: 3) meet these criteria. The Basic Local Alignment Search Tool (BLAST) was used to finds regions of local similarity between amino acid sequences, and a search of the decapeptide ADETQALPQR (SEQ ID NO: 1) showed that it is unique to the nucleocapsid phosphoprotein in SARS-2 corona virus, while a similar search for the octapeptide GFYAEGSR (SEQ ID NO: 2) showed that it is unique to the nucleocapsid protein in SARS-2 corona virus as well as three other organisms (a hypothetical protein from *Sorangium cellulosum*, a glycosyltransferase family 39 protein from *Emticicia* species and the UDP-N-acetylmuramoyl-L-alanine-D-glutamate ligase from *Agrobacterium tumefaciens*). A BLAST search for the octapeptide EITVATSR (SEQ ID NO: 3) showed that it is a membrane glycoprotein from the SARS-CoV-2 virus and is part of protein sequences from 15 other organisms.

TABLE 1

Sequence IDs

| Sequence name: | Sequence: |
|---|---|
| SEQ ID NO: 1 | ADETQALPQR |
| SEQ ID NO: 2 | GFYAEGSR |
| SEQ ID NO: 3 | EITVATSR |

The presence and relative abundance of these three peptides is an initial defining criterion for a virus-positive specimen. Synthetic versions of these peptides, and $^{13}$C-labelled analogues (for use as internal standards) can be purchased from commercial sources.

Preparing the sample for MS requires digestion of protein to peptides. Hydrogen-deuterium exchange protocols (HDX) can be utilized and are sufficiently fast for the experiment to be completed in less than 15 minutes. The HDX protocols do not produce insurmountable problems, given that effective HDX protocols have been published (Faull, et al., 2000; Konermann, et al., 2011; Wales, et al., 2008; Miranker, et al., 1996; Zheng, et al., 2019). An example of a technical challenge is recovery of proteins from the starting volume of liquid. Having accomplished this step quickly, fast protein digestion releasing peptides can be used for rapid MS with multiple reaction monitoring (MRM). Typical low pH pepsin treatments can be modified to include immobilized trypsin at pH 8.0. If low pH is necessary for protein recovery, pepsin can be used to generate peptides. For utilizing trypsin, bringing pH to 8.0 (for trypsin) is desirable because of the unrivaled specificity of this enzyme. Immobilized enzymes are commercially available and are used because of the high throughput this technology provides. Once digested, MS-MRM is fast and straightforward. Internal standards are added as early as possible. A determination can be made whether the initial capture liquid or the digestion buffer is preferred. Given the desire to keep costs down, the latter can be desirable.

Samples can be injected onto a reversed phase high pressure solid core liquid chromatographic column (e.g., Phenomenex Kinetex C18, 100 Å, 1.6μ, 100×2.1 mm or equivalent) equilibrated in eluant A (e.g., water/formic acid, 100/0.1, v/v) and eluted with and increasing concentration of eluant B (e.g., acetonitrile/formic acid, 100/0.1, v/v) for which the gradient and flow rate can be perfected for resolution and speed of analysis. The eluant is directed to an electrospray ion source connected to a mass spectrometer. Both triple quadrupole, linear ion trap and orbitrap instruments can be used and compared for sensitivity and clarity of the resulting signals. Data can be recorded as the peak intensity in the traces resulting from preselected parent ions fragmenting to their corresponding fragment ions under previously optimized collisionally activated conditions at the retention times of the authentic standards. Maximal signal intensity can be achieved using 3 Da or higher acceptance windows for the parent and possibly fragment ions on the ion trap instruments, and field width at half mass (FWHM) settings of up to 2 Da on the triple quadrupole instruments. $^{13}$C-Labelled internal standards can be added, as early as possible in method development, to help determine whether the initial capture liquid or the digestion buffer is preferred, and to provide precise chromatographic retention time (Rt) indices because the introduction of a few $^{13}$C atoms into a molecule has no effect on reversed phase Rt's.

The data sets collected from mass spectrometry can be analyzed through detailed statistical and machine learning based techniques to classify the given samples into positive or negative cases. The key objective of the present analysis is to develop a computational technique that can provide an accurate diagnosis with minimal computational wait-time (order of seconds or less) and its uncertainty quantified. In the actual data, it is expected that variations in the intensity measures of the samples, as well as the presence noise, can give rise to development of robust classification algorithms through modal analysis to detect SARS-CoV-2 (Taira, et al., 2017; Taira, et al., 2020). Primary signals can be extracted from test data by extracting modal basis signal that represents the reference data. Also, extracting sub-dominant modal signatures can provide determination of how data fluctuations can appear in each data set. These analysis techniques are motivated by state-of-the-art diagnostics techniques used in turbulent flow analysis. Moreover, uncertainties can be quantified using MCMC-type techniques (Monte Carlo based uncertainty quantification) to ensure that ambiguous data sets can be further examined or be flagged for additional testing (Smith, 2013; Bin, et al., 2015).

The Sentinel system has substantial advantages over other Sentinels for monitoring the antigens, for example such as for SARS-CoV-2, in the environment. The form factor of the device and the collection methodology, for example shown in FIG. 1, permits detection of viruses in a small volume, enabling a new generation of Sentinel systems herein.

The present technology includes the following novel and unusual features. It uses a Blu-ray laser-based fluorescence detection system rather than traditional widefield fluorescent microscopy. The adaptation of the OPU fluorescence detection scheme to a flow through Sentinel system. The current gold standard for COVID-19 testing is RT-PCR. The assay can provide a replacement to be used for this application. Conducting the assay and analyzing results can involve a trained lab technician, but the fully deployed system can automate the process.

The present technology offers the following advantages. Collector: The continuous dropwise condensation technology allows continuous high efficiency submicron particle collection while producing a small volume of low viscosity distilled water as the "transport" medium. This feature enables use of fluidic handling systems to automate every step of the process.

Sample preparation: Unlike dry sample collection systems, the system does not require rinsing or dissolving the filters to release the virus. Additionally, because the samples provided by the collector are small volumes of low viscosity water and pathogen, limited concentration is needed, and pre-processing can be designed for complex detection systems with more flexibility. The modular design of the system also allows for addition of steps in the future as needed.

Detection: The use of two very different detection approaches is designed to address the need for speed, selectivity and sensitivity. The proposed antibody-based fluorescence technique is a novel approach that has the capacity to capture and identify COVID-19 in under 10 minutes with a sensitivity that rivals rtPCR. The MS detection system has unrivaled specificity and selectivity and the potential to be quickly repurposed for detection of other pathogens.

Potential security/military applications: In many military base and office settings, including hospitals, terminals, etc. there is a need for a Sentinel system to monitor the air as many military personnel, and in some cases civilians, might be present. By monitoring the environment air circulation, major outbreaks at these places can be prevented. Sentinel systems can be utilized to detect biological threats in public places.

The technology can be adapted for specific environments and applications. Numerical simulations can be performed, including modeling of the collection system using numerical simulation to optimize the maximum capture efficiency of device with flowrate using substrate temperature, substrate topography, impinging jet parameters, etc. Numerical simulations can include modeling of the fluid preparation system. The fluidic system that starts from the collection unit and goes through the preparation unit can be numerically analyzed. This analysis includes heating and vacuuming process to reduce the sample liquid volume. In addition, there can be a "sample storage" location for possibility of additional testing.

Examples of experimental testing that can be used include testing airflows containing aerosols with size and concentration of those exemplary of environmental monitoring and production of a set up designed for maximum efficiency of particle capturing by tuning substrate temperature and relative humidity of the incoming air. A fluidic system can be fabricated to show the feasibility of using the system for collecting the samples from the collector, pre-processed them and make them available to the detection system. Example detection systems described herein are mass spectrometry and FISH-Y.

Table 2 below features of two embodiments of the technology.

TABLE 2

|  | Embodiment 1 | Embodiment 2 |
| --- | --- | --- |
| Sensitivity | Less than 1 particles/L | Less than 0.05 Particles/L |
| Specificity | 75% | 95% |
| False Alarm Rate | Less than $10^{-5}$/analysis | Less than $10^{-6}$/analysis |
| Time to Detect | 15 minutes | Under 5 minutes |

Three exemplary implementations of the technology are: an office of 50 $m^3$, a conference room or classroom of 300 $m^3$, and central monitoring of buildings with 10 stories. The flowrates and particle concentrations for the modeling and experimental setups can be based on available ASHRAE standards.

SARS-CoV-2 or other pathogen signatures can be examined and developed to meet threshold performance metrics including sensitivity, specificity, and time to detect using lentivirus in the lab. Testing of SARS-CoV-2 can be conducted against a panel of other viruses and common environmental contaminants including artificial fog, submicron particles, influenza, and rhinovirus.

The size, weight, and power requirement of the device can be maintained to appropriate levels.

A major advantage of the Sentinel system is its suitability to adaptation to other pathogens beyond SARS-CoV-2. Any airborne particle containing pathogens having particle or cell sizes of tens of nanometers to microns can be effectively collected, prepared, and detected using MS or the FISH-Y system.

The collection system can be adjusted to the particle size of interest using the primary data; it can adapt to any size of airborne pathogenic particles. By incorporating data science to the detection system, MS and FISH-Y, can adapt to new pathogens in less than a month. Also, there is ability to save samples for additional analysis: The collection system provides sufficient sample volumes for storage in case of the need for additional analysis.

The systems disclosed herein have been designed to meet the need for rapid, inexpensive point-of-care testing during the COVID-19 pandemic. The systems can be adapted to detect any respiratory virus by using different probes to conjugate to the viral RNA. The laser scanning can be beneficial in other fluorescence microscopy applications, given its accuracy and autofocus function.

REFERENCES

A. R. Rahmani, M. Leili, G. Azarian, A. Poormohammadi, Sampling and detection of corona viruses in air: A mini review, Science of the Total Environment, 740 (2020) 140207.
CDC guidance: cdc.gov/coronavirus/2019-ncov/lab/resources/antigen-tests-guidelines.html
X. Chen, R. Li, Z. Pan, C. Qian, Y. Yang, R. You, J. Zhao, P. Liu, L. Gao, Z. Li, Q. Huang, L. Xu, J. Tang, Q. Tian, W. Yao, L. Hu, X. Yan, X. Zhou, Y. Wu, K. Deng, Z. Zhang, Z. Qian, Y. Chen, L. Ye, Human monoclonal antibodies block the binding of SARS-CoV-2 spike protein to angiotensin converting enzyme 2 receptor, Cellular and Molecular Immunology, 17 (2020) 647-649.
Y. Huang, C. Yang, X.-f. Xu, W. Xu, S.-w. Liu, Structural and functional properties of SARS-CoV-2 spike protein: potential antivirus drug development for COVID-19, Acta Pharmacologica Sinica, 41 (2020) 1141-1149.
K. Fukami, K. Fukagata, K. Taira, Assessment of Supervised Machine Learning Methods for Fluid Flows, Theoretical and Computational Fluid Dynamics, 34 (2020) 497-519.
R. Maulik, K. Fukami, N. Ramachandra, K. Fukagata, K. Taira, Probabilistic Neural Networks for Fluid Flow Model-Order Reduction and Data Recovery, Physical Review Fluids, 5 (2020) 104401.
K. Faull, J. Higginson, A. Waring, T. To, J. Whitelegge, R. Stevens, C. Fluharty, A. Fluharty, Hydrogen-deuterium exchange signature of porcine cerebroside sulfate activator protein, J Mass Spectrom., 35 (2000) 392-401.
L. Konermann, J. Pan, Y. Liu, Hydrogen exchange mass spectrometry for studying protein structure and dynamics., Chem Soc Rev., 40 (2011) 1224-1234.
T. Wales, K. Fadgen, G. Gerhardt, J. Engen, High-speed and high-resolution UPLC separation at zero degrees Celsius., Anal Chem., 80 (2008) 6815-6820.
A. Miranker, C. Robinson, S. Radford, C. Dobson, Investigation of protein folding by mass spectrometry., FASEB J., 10 (1996) 93-101.
J. Zheng, T. Strutzenberg, B. Pascal, P. Griffin, Protein dynamics and conformational changes explored by hydrogen/deuterium exchange mass spectrometry., Curr Opin Struct Biol., 58 (2019) 305-313.
K. Taira, S. L. Brunton, S. T. M. Dawson, C. W. Rowley, T. Colonius, B. J. McKeon, O. T. Schmidt, S. Gordeyev, V. Theofilis, L. S. Ukeiley, Modal Analysis of Fluid Flows: An Overview, AIAA Journal, 55 (2017) 4013-4041.
K. Taira, M. S. Hemati, S. L. Brunton, Y. Sun, K. Duraisamy, S. Bagheri, S. T. M. Dawson, C.-A. Yeh, Modal Analysis of Fluid Flows: Applications and Outlook, AIAA Journal, 58 (2020) 998-1022.
R. C. Smith, Uncertainty Quantification: Theory, Implementation, and Applications, SIAM, (2013).
J. Bin, W. S. Oates, K. Taira, Thermoacoustic Modeling and Uncertainty Analysis of Two-Dimensional Conductive Membranes, Journal of Applied Physics, 117 (2015) 064506.

The content of the ASCII text file of the sequence listing named "Sequence-Listing-as-filed-19815-0801", having a size of 765 bytes and a creation date of 17 May 2022, and electronically submitted via EFS-Web on 17 May 2022, is incorporated herein by reference in its entirety.

The invention claimed is:

1. A device for automated detection of a microbial pathogen in air, the system comprising:
   a collection module operative to continuously collect an air sample suspected of comprising the microbial pathogen and form a continuously flowing liquid sample comprising the microbial pathogen from the air sample;
   a sample processing module operative to mix a labeling reagent with the flowing liquid sample, whereby the reagent labels the microbial pathogen to provide fluorescently labeled microbial pathogen suspended in a continuously flowing liquid stream;
   a centrifugation module comprising a spinning rotor operative to separate the fluorescently labeled pathogen in the continuously flowing stream from unbound labeling reagent and continuously flow the separated fluorescently labeled pathogen through a scanning region of the rotor; and
   a fluorescence detector operative to continuously scan the scanning region and detect the presence, absence, or amount of the fluorescently labelled pathogen.

2. The device of claim 1, wherein the centrifuge rotor comprises an inner wall, an outer wall, and a channel therebetween, wherein the channel is configured to accept the continuously flowing stream containing fluorescently labeled pathogen and unbound label at an upper region and to direct the stream downwards and outwards towards a lower region of the channel comprising the scanning region, and wherein the centrifuge rotor forms a sedimentation envelope that concentrates the labeled pathogen near the outer wall of the rotor at the scanning region.

3. The device of claim 2, wherein the outer wall comprises a transparent window covering the scanning region and one or more reflective strips disposed on an inner side of the outer wall; the reflective material operative to reflect fluorescence excitation light back to the detector to an autofocus mechanism of the detector.

4. The device of claim 1, wherein the labeling reagent comprises a fluorescently labeled aptamer or antibody having binding specificity for a molecular component of the microbial pathogen.

5. The device of claim 1, wherein the detector comprises, an excitation laser, a photomultiplier tube (PMT), an optical pickup (OPU), or a photodiode-array (PDA) or a combination thereof.

6. The device of claim 5, wherein the detector comprises an excitation laser having an illumination intensity of about $10^8$ mW/mm$^2$, a spot size of about 150 nm, and a wavelength of about 405 nm.

7. The device of claim 1, wherein the detector is positioned exterior to the outer wall of the centrifuge rotor and is configured to provide fluorescence excitation light to the scanning region and receive fluorescence emission light from the scanning region, and wherein the detector employs an autofocus mechanism that enables substantially only fluorescence emission light from the labeled pathogen to be detected.

8. The device of claim 1, wherein the collection module comprises a condenser operative to cool a collection substrate below a dewpoint temperature, the condenser comprising a cooled hydrophobic central impact zone, a hydrophilic microfluidic channel or collection zone around the central impact zone, and a fluidic connection and optional pump capable of flowing collected liquid from the substrate to the sample processing module.

9. The device of claim 1 that provides detection in less than about 15 minutes after the air sample enters the collection module.

10. A method of detecting a microbial pathogen in an environmental air sample; the method comprising the steps:
   (a) providing the device of claim 1 and a labeling reagent configured to bind and fluorescently label the microbial pathogen;
   (b) directing a flow of environmental air suspected of containing the microbial pathogen into the collection module of the device, whereby a liquid sample comprising the microbial pathogen from the air sample is formed;
   (c) labeling the microbial pathogen in the liquid sample by mixing the labeling reagent with the liquid sample, thereby yielding fluorescently labeled microbial pathogen in a continuously flowing liquid stream;

(d) separating the fluorescently labeled pathogen in the continuously flowing stream from unbound labeling reagent using the centrifugation module and continuously flowing the separated fluorescently labeled pathogen through a scanning region of the rotor;

(e) detecting the fluorescently labelled pathogen using the fluorescence detector to provide a signal as a measure of the presence, absence, or amount of the pathogen in the air sample.

11. The method of claim 10, further comprising:
during step (b), cooling a collection substrate to below a dewpoint temperature of the environmental air and/or changing humidity of the collected environmental air to promote harvesting of aerosol droplets from the air.

12. The method of claim 10, further comprising intermittently dispensing a cleaning agent into the spinning centrifuge.

13. The method of claim 10, wherein steps (b)-(e) are performed continuously in continuous flow fashion.

14. The method of claim 10, wherein the time from intake of an air sample to detection of a pathogen in the sample is less than about 15 minutes.

15. The method of claim 10, wherein the microbial pathogen is a virus or bacterium that causes a respiratory disease.

16. The method of claim 15, wherein the microbial pathogen is SARS-CoV-2.

17. The method of claim 10, wherein the labeling reagent comprises a fluorescently labeled aptamer or antibody.

18. A kit for automated detection of a microbial pathogen in environmental air, the kit comprising:
the device of claim 1; and
one or more labeling reagents for use with the device to detect one or more selected pathogenic microbes.

19. The kit of claim 18, wherein the kit is configured to be deployed in an airport, a jet, a train, a terminal, a theatre, a military facility, a prison, a medical facility, a factory, a warehouse, a school, a nursery, an office, or a hospital.

* * * * *

SEQUENCE LISTING

<160> NUMBER OF SEQ ID NOS: 3

<210> SEQ ID NO 1
<211> LENGTH: 10
<212> TYPE: PRT

```
<213> ORGANISM: SARS-CoV-2 virus

<400> SEQUENCE: 1

Ala Asp Glu Thr Gln Ala Leu Pro Gln Arg
1               5                   10

<210> SEQ ID NO 2
<211> LENGTH: 8
<212> TYPE: PRT
<213> ORGANISM: SARS-CoV-2 virus

<400> SEQUENCE: 2

Gly Phe Tyr Ala Glu Gly Ser Arg
1               5

<210> SEQ ID NO 3
<211> LENGTH: 8
<212> TYPE: PRT
<213> ORGANISM: SARS-CoV-2 virus

<400> SEQUENCE: 3

Glu Ile Thr Val Ala Thr Ser Arg
1               5
```